July 30, 1968  J. G. JACKSON, JR., ET AL  3,394,761
PARALLEL PIPE SUSPENSION APPARATUS
Original Filed July 3, 1961  7 Sheets-Sheet 1

ALLEN F. RHODES
JOHN G. JACKSON, JR., Deceased,
By Bank of the Southwest National
Association, Houston, Executor
JOHN BESON
INVENTORS BY *Carl B. Fox, Jr.*

ATTORNEY

July 30, 1968  J. G. JACKSON, JR., ET AL  3,394,761
PARALLEL PIPE SUSPENSION APPARATUS
Original Filed July 3, 1961  7 Sheets-Sheet 2
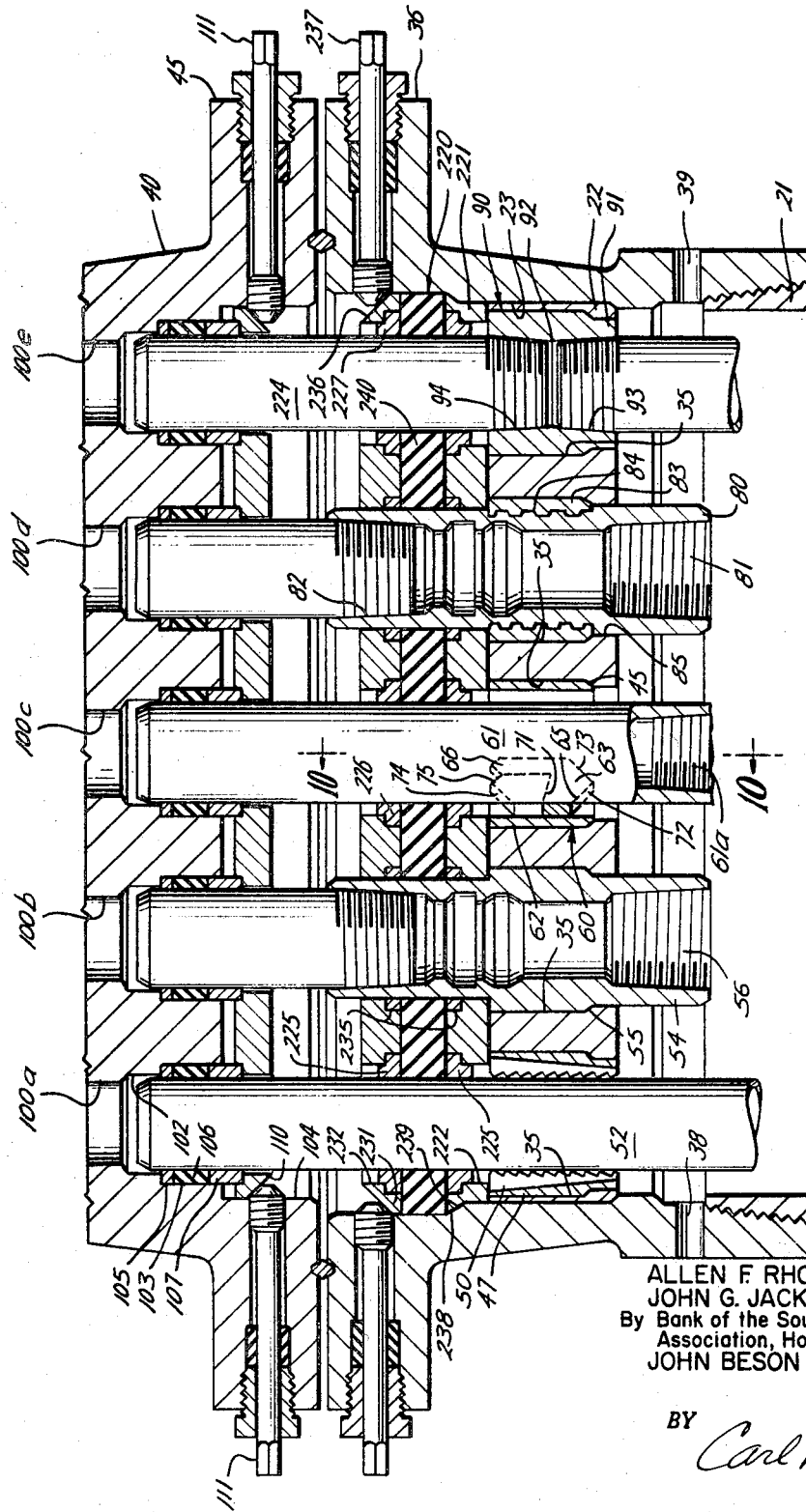
ALLEN F. RHODES
JOHN G. JACKSON, JR., Deceased,
By Bank of the Southwest National
 Association, Houston, Executor
JOHN BESON
INVENTORS
BY *Carl B. Fox, Jr.*
ATTORNEY July 30, 1968   J. G. JACKSON, JR., ET AL   3,394,761
PARALLEL PIPE SUSPENSION APPARATUS
Original Filed July 3, 1961   7 Sheets-Sheet 3
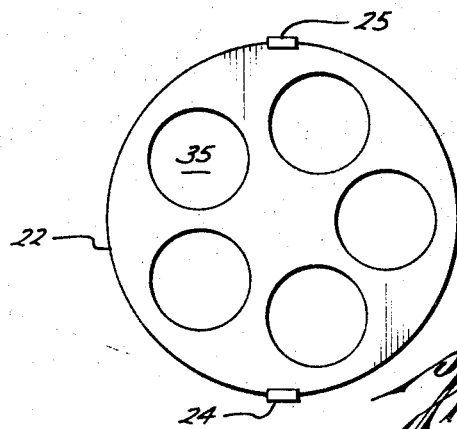
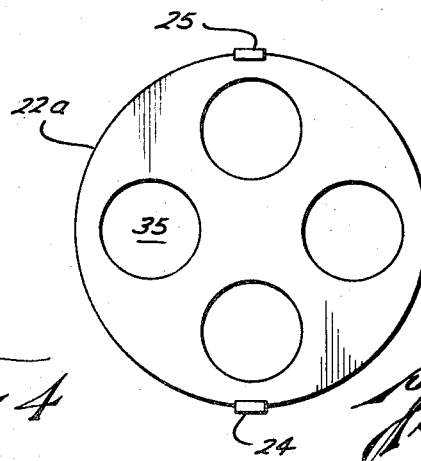
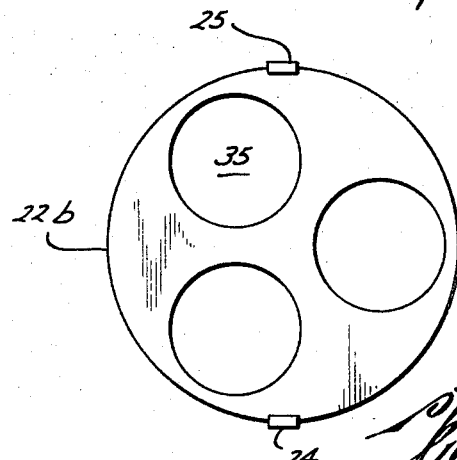
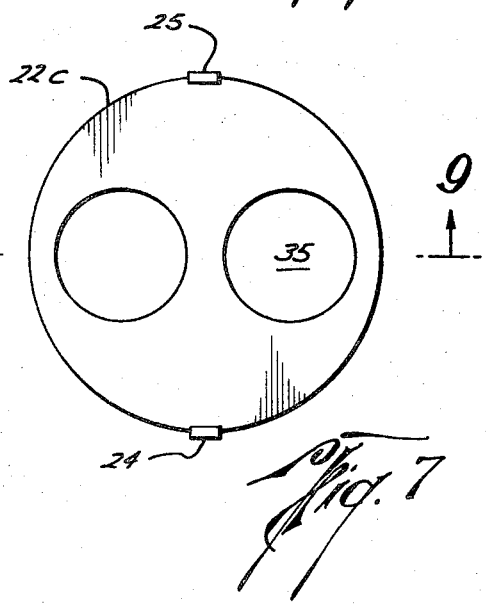
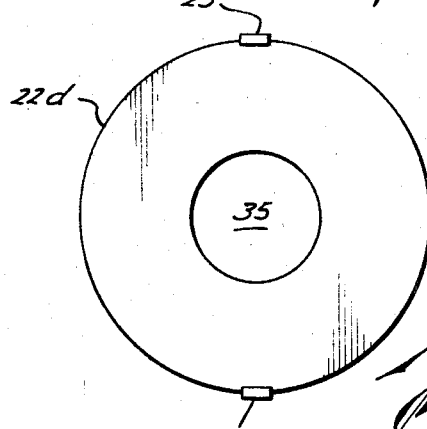
ALLEN F. RHODES
JOHN G. JACKSON, JR., Deceased,
By Bank of the Southwest National
Association, Houston, Executor
JOHN BESON
INVENTORS
BY *Carl B. Fot, Jr.*
ATTORNEY

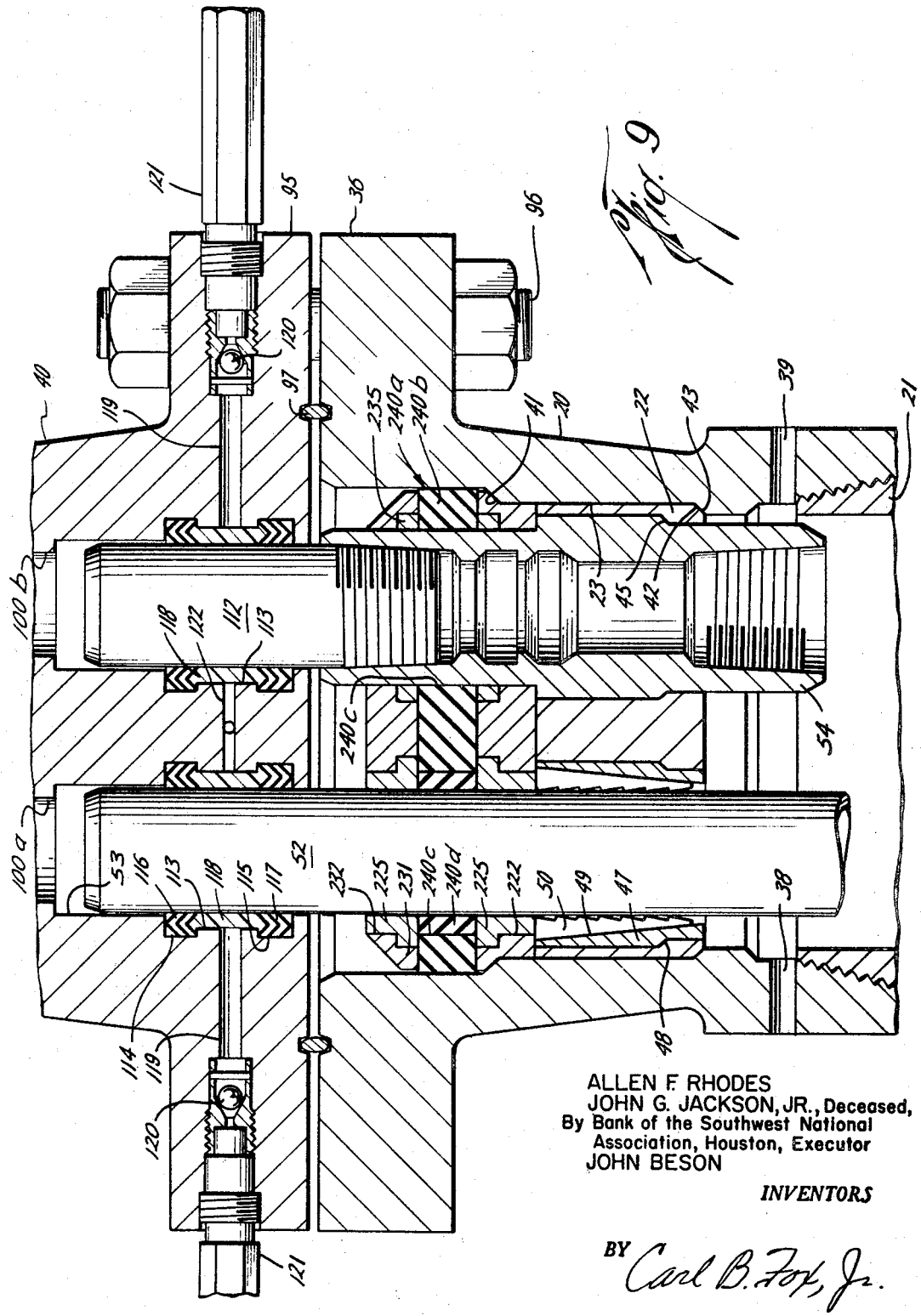
ALLEN F. RHODES
JOHN G. JACKSON, JR., Deceased,
By Bank of the Southwest National
Association, Houston, Executor
JOHN BESON
INVENTORS
BY *Carl B. Fox, Jr.*
ATTORNEY

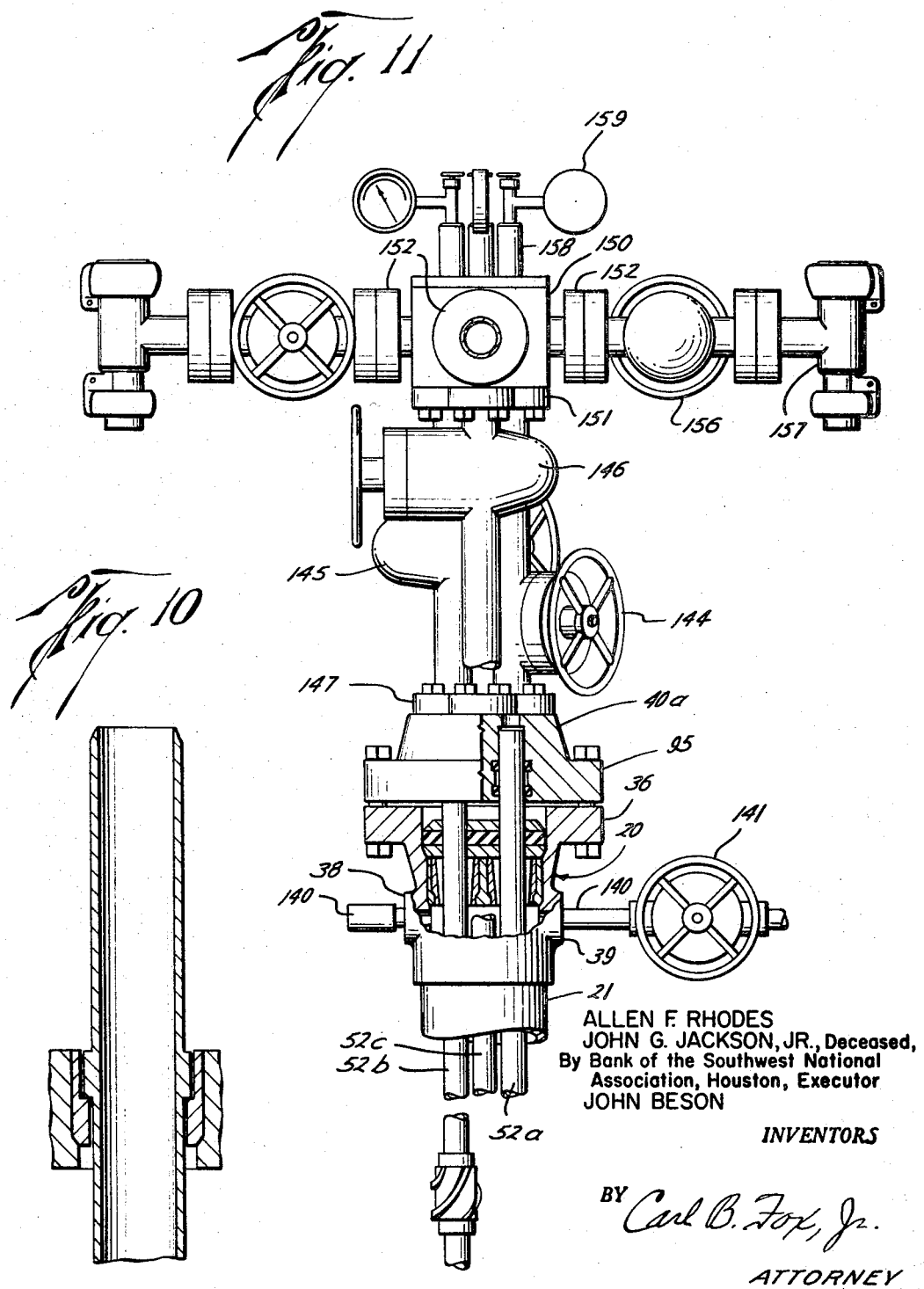

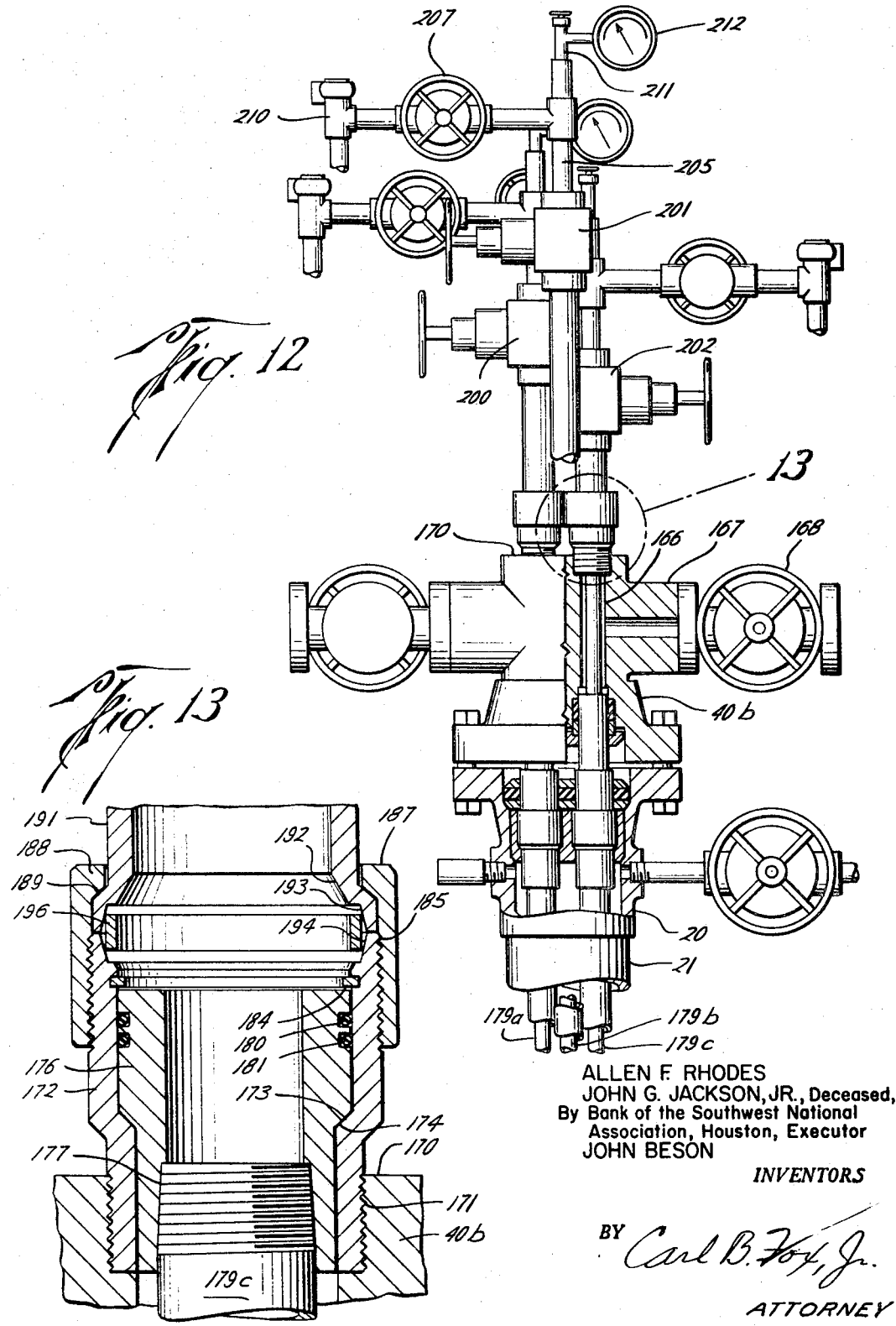

July 30, 1968
J. G. JACKSON, JR., ET AL
3,394,761
PARALLEL PIPE SUSPENSION APPARATUS
Original Filed July 3, 1961
7 Sheets-Sheet 7
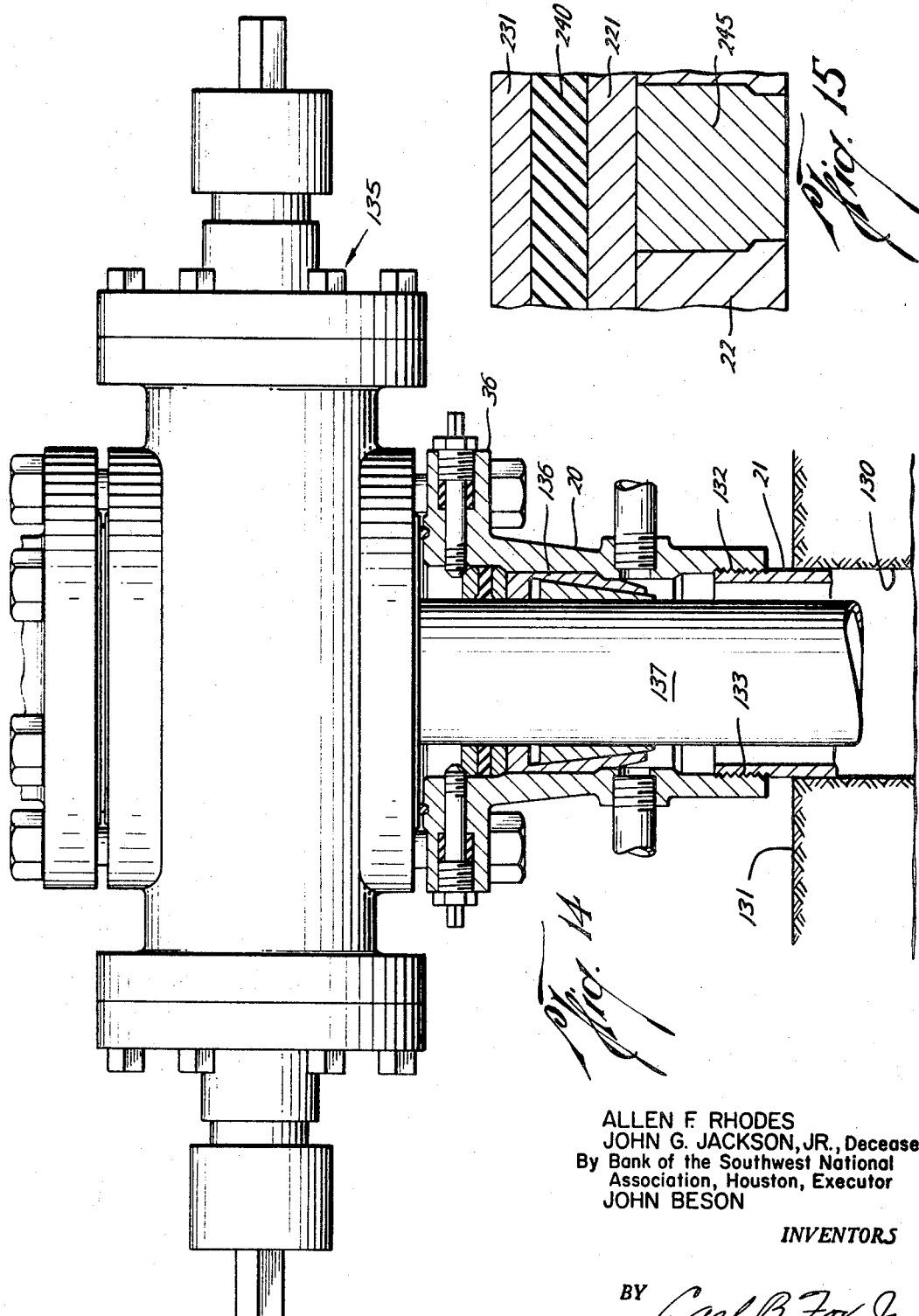
ALLEN F. RHODES
JOHN G. JACKSON, JR., Deceased,
By Bank of the Southwest National
Association, Houston, Executor
JOHN BESON
*INVENTORS*
BY *Carl B. Fox, Jr.*
*ATTORNEY*

United States Patent Office 3,394,761
Patented July 30, 1968

3,394,761
PARALLEL PIPE SUSPENSION APPARATUS
John G. Jackson, Jr., deceased, late of Angleton, Tex., by The Bank of the Southwest National Association, Houston, executor and trustee, Houston, Tex., John Beson, Houston, Tex., and Allen F. Rhodes, Chicago, Ill., assignors to Rockwell Manufacturing Company, Houston, Tex., a corporation of Pennsylvania
Continuation of application Ser. No. 456,889, May 4, 1965, which is a continuation of application Ser. No. 121,517, July 3, 1961. This application Jan. 4, 1966, Ser. No. 530,751
8 Claims. (Cl. 166—89)

This application is a continuation of our copending application Ser. No. 456,889, filed May 4, 1965, and now abandoned, which was a continuation of and copending with our application Ser. No. 121,517, filed July 3, 1961 and now abandoned.

This application relates to apparatus for use in connection with drilling and completing of petroleum and other wells. The apparatus is of a novel design suitable for completion of a well in any of several manners depending on the location of the well, the characteristics of the strata into which the well is to be drilled, the predictable and unpredictable condition in the well after the well has been drilled and other circumstances. Considered broadly, this invention seeks to provide apparatus for wells which is of universal utility and adaptability so that the apparatus afforded by this invention can be used conveniently and profitably in connection with any type of well.

It is a principal objective of the invention to provide apparatus useful in the drilling of wells of the so-called "tubingless completion" type.

Another objective of the invention is to provide such apparatus which may be adapted for either wells having tubing type completion or for wells of tubingless type, regardless of whether or not the final form of the well has been predetermined in advance of the drilling and completion of the well.

Briefly, the apparatus provided by the invention includes a well head into which there is placed a hanger adapter which may take any of several forms. The adapter may have one or a plurality of vertical openings each used for suspending a pipe or pipes in the well. Thus, for example, a hanger adapter having three vertical openings may be used for the suspending from one to six pipes in the well, although where a hanger adapter having three vertical openings is used ordinarily three pipes will be supported in the well therefrom.

The vertical openings of the hanger adapter are preferably all identical. A plurality of forms of pipe hangers may alternatively be supported in each of the vertical openings so that the decision as to the type of pipe hanger to be employed for any particular pipe in any particular hanger adapter opening need not be made until after the pipe has been run into the well and until after unforeseeable circumstances in the well have already been encountered. Thus, the apparatus is of universal applicability and adaptability since no decision as to the form of well completion to be employed for the well need be made until the last well pipe has been run into the well.

Until recently, conventional oil and gas well completions employed the use of both casings and tubings. The casings were used to line the open well bore and provide structural barriers to prevent the earth formations from crumbling and blocking the well bore. Casing has been usually bonded to the formation at least in the vicinity of its lower end by circulation of a mixture of water and cement into the annular space between the casing and the formation.

Generally the casing was only slightly smaller in outside diameter than the drilled bore of the well, and when set in place and cemented provided a relatively large passage from the producing formations to the surface. With the casing thus providing a lined passage in the well, it has been usually the practice to produce the formation or formations through a smaller pipe or pipes suspended inside the casing. As a result of this practice, the term "casing" is generally used to denote a pipe which lines the well bore and which is bonded or fixed in the well bore by cement. The term "tubing" is generally used to describe smaller pipes which are suspended inside casings and are capable of being removed from the well.

It is within the context of these definitions that the expression "tubingless completion" is employed. In a tubingless completion there are generally two or more parallel strings of smaller diameter casing suspended directly in the open bore of the well. These parallel strings of casing are usually cemented in place. In tublingless completions, the several strings of casing generally function both as casing and tubing. They function as casing in that they are fixed in the well and line the open hole. They also serve as tubing in that production from the various formations flows through them directly to the surface without the use of any other pipes. This practice has been further refined through the use of multiple parallel strings of casing having in each a string of smaller diameter pipe serving as an additional tubing.

In the development of oil and gas well completion techniques, pipe was first used to line the open well hole or bore and prevent it from being plugged by crumbling of the earth formations. The function of the pipe was therefore to encase or case the well bore and the term "casing" came to be used to describe pipe used in this manner. In early completions the pipe was merely lowered into the open hole with no support other than its contact with the bottom of the hole and friction between the inner bore of the hole and the outer surface of the pipe. A large valve was usually connected to the end of the pipe protruding above the surface and was used to control the flow of fluid and gas coming from the well. As experience was gained in completing and producing wells, the techniques were developed for bonding the casing to the formation with cement.

The practice of supporting the casing in tension from the surface was also developed. This is made possible by setting a short length (200 to 300 feet) of large diameter casing and filling the annular space between the casing and open hole with cement. The string of casing is generally referred to as conductor or surface casing and one of its functions is to provide a foundation for supporting, in tension of their own weight, other strings of pipe subsequently inserted in the well. A well head, or, as it is sometimes described, lowermost casing head, is attached to the upper end of the conductor casing usually by means of a threaded or welded connection. The lowermost casing head is fitted with a connection, usually a bolting flange, at its upper end and has within it a tapered circular shoulder which provides a surface for supporting the next string of casing to be inserted into the well. A casing hanger which grips the outer surface of the upper end of the next string of casing rests on the tapered shoulder of the casing head and serves to transmit the load of the inner strings of casing to the cemented outer string of casing.

The early practice of producing wells through casing was later discontinued, particularly in the case of deep wells. The use of strings of pipe of smaller diameter suspended inside the casings as flow passages for well fluids was gradually brought into general use in petroleum production as producing techniques improved. This smaller diameter pipe was called "tubing," and it was felt that its use provided a number of advantages overflowing directly through the casing.

In general, the term "casing" has come to be used to define strings of pipe which are in direct contact with the formations surrounding the well. As a rule casings are bonded to the formation by cement for a substantial portion of their length, sometimes for their entire length, and therefore are not easily removed from the well. The term "tubing" generally refers to the strings of pipe which are suspended inside the innermost string of casing. Tubing is not bonded to the formations and can be readily removed for maintenance and repair. Tubing is also supported in tension, from the surface of the well.

In the drilling of a well, there is often found more than one formation that is capable of producing oil or gas in commercial quantities. At first it was the practice to complete the well so that the most promising formation was produced. If it was felt that any other of the formations was sufficiently promising, another well was drilled to produce it. If this was not done, it was generally the practice to produce the most promising formation to depletion and then to recomplete the well in another formation at some later time. To improve on this inefficient method of production, the practice of completing and producing more than one formation in the same well was developed. The first way in which this was done was to complete and produce one zone through the tubing and to complete and produce another zone through the casing. An expandable rubber seal or packer carried around the lower end of the tubing was used to provide a seal inside the casing between the two producing zones. As a general rule, the lower zone was produced through the tubing and the upper zone was produced through the tubing-casing annulus.

It later became the practice to suspend two or more parallel strings of tubing inside the casing. With this completion technique, it is possible to produce from more than two formations or zones through one well. Packers are used to seal off each producing formation and a separate string of tubing is suspended to each formation to provide a flow passage to the surface. The use of this technique has thus far made it possible to produce as many as five formations in one well.

To reduce costs and to provide means for producing from formations which were heretofore considered of insufficient capacity to be economical, the technique of multiple parallel completion has been further employed. In this method no single large diameter casing is suspended through all producing formations. In its place, separate strings of casing having a relatively small diameter are suspended parallel to one another with each extending only to the depth required for it to reach a particular producing formation. After the required number of parallel casing strings have been suspended in the open well, cement is pumped into the well through the longest string of casing in sufficient quantity to fill the open hole to a point above the shallowest producing formation. Cement is displaced from the string of casing through which it is pumped by pumping into the casing drilling mud or water behind the cement. The cement serves to seal between the various producing formations and to prevent comingling of the productions.

The producing formations are then connected to their respective casing strings by passages created by specially oriented perforating guns. This form of completion in which several formations in a well are produced through separate multiple parallel strings of casing is sometimes referred to as "tubingless completion." Further modifications of this technique have been developed, however, in which multiple parallel strings of casing are used with a string of tubing suspended inside each string of casing. An actual example of this technique is one in which three parallel strings of casing were suspended within a well with a string of tubing suspended inside each string of casing. This arrangement was used to produce from six separate formations simultaneously.

Among the advantages of the apparatus provided by this invention, and to be particularly described and claimed, are that no casing surrounding the well bore is needed which reduces the cost of the well, that each tubing is separately run into the well and suspended in any one of a variety of suspensions at the well head, that the selection of the method of well head suspension for each pipe need not be made until the time that the suspension is made after the pipe has been run, that each well pipe is set and operated completely independent of every other well pipe, and that no packers or other seals to the sides of the well formations need be provided other than the cement, or other cementing formation, used to fix the well pipes in place in the well.

Other objects and advantages of the invention will appear from the following detailed description of preferred embodiments thereof, reference being made to the accompanying drawings, of which:

FIGURE 3 is a vertical cross section taken along line 3—3 of FIGURE 2, the cross section being through the circularly arranged axes of the several hanger openings of the hanger housing shown in FIGURES 1 and 2;

FIGURES 4–8 are each a plan view of a modified form of the hanger housing shown in FIGURES 1–3;

FIGURE 9 is a vertical cross section of the apparatus with the hanger housing form of FIGURE 7 shown assembled therein, the section being taken as indicated by line 9—9 of FIGURE 7;

FIGURE 10 is a partial vertical cross section taken at line 10—10 of FIGURE 3;

FIGURES 11 and 12 are elevations, partly in vertical cross section, showing two well head assemblies according to the invention;

FIGURE 13 is an enlarged vertical cross section of the portion of FIGURE 12 within circle 13 of FIGURE 12;

FIGURE 14 is an elevational view, partly in vertical cross section, showing another apparatus assembly according to the invention; and FIGURE 15 is a partial view showing a hanger opening plug.

Figure 1:
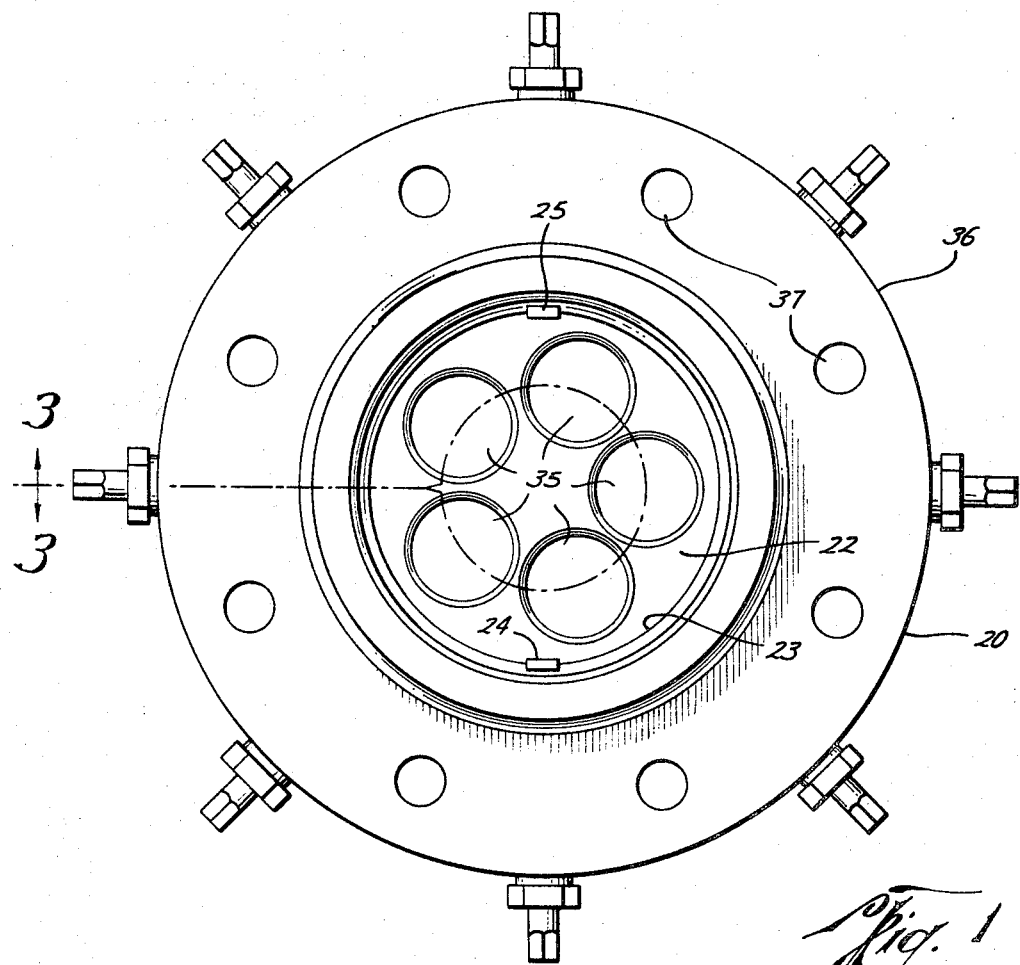
FIGURE 1 is a plan view of preferred form of apparatus with upper and some interior parts removed.

Referring now to the drawings in detail, and first to FIGURE 1, there is shown a plan view of a well head having five well pipes supported therein. The Christmas tree and other control apparatus is not shown in FIGURE 1. The well pipes will hereinafter be referred to as casings consistent with the foregoing use of that term. In FIGURE 1 of the drawings, there is shown the head 20, which will usually be a casing head but may be a tubing head or other form of well head. Head 20 is connected to a surface or conductor casing 21 (see also FIGURES 3 and 9). A hanger housing 22 is disposed in vertical opening 23 of head 20, keys or guide means 24 and 25 at opposite sides of housing 22 serving to azimuthally align housing 22 within opening 23 which has corresponding slots to receive the keys.

Housing 22 has the five circularly and equally peripherally spaced casing hangers 30–34 supported therein, the hangers being shown only in FIGURE 3. Each of the hangers 30–34 is received in one of the five identical openings 35 of housing 22, and each has a well pipe supported therebelow. As shown in FIGURE 3, each of the hangers 30–34 is of a different type. However, the type of each hanger is subject to selective variation depending upon the requirements of the well and the operator of the well.

With continued reference to FIGURES 1 and 3, head 20 has upper connection flange 36 having equally spaced bolt holes 37 therearound. Flange 36 is used for connection of adapter means or blowout preventer means (not shown) to control the well during drilling and completion of the well. In case an adapter is used, the blowout preventer will be connected above the adapter.

Figure 2:
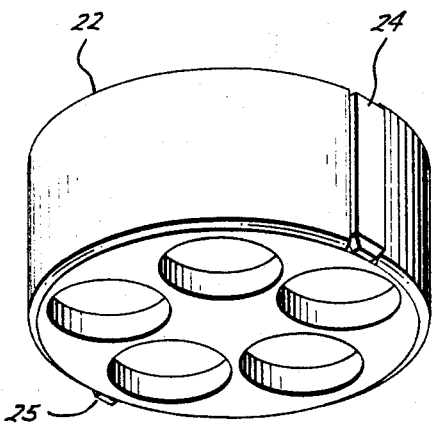
FIGURE 2 is a lower perspective view of the hanger housing shown at the central part of FIGURE 1.

Referring now to FIGURES 4–8, it is indicated schematically how a housing such as housing 22 may have one, two, three, or four hanger openings 35 therethrough instead of the five openings 35 as indicated for hanger 22. It is possible to provide any number of such openings in a housing. In FIGURE 4, hanger housing 22 has five openings 35 each for receiving and supporting a separate hanger means of one of the specialized forms to be described, hanger housing 22 having been already partially described with reference to FIGURES 1–3. In FIGURE 5, hanger 22a has four hanger openings 35. Hanger housing 22b of FIGURE 6 has three such openings. And hangers 22c, 22d of FIGURES 7–8, have two openings and one opening, respectively. For each number of openings 35 in a housing, the arrangement is such as to best space the openings for simultaneous running of the required number of well pipes. Housings 22–22d have the same laterally outward dimensions and form so that the housings are interchangeable with respect to seating in well head 20. Housings with hanger means openings greater than five in number may be used, and this invention contemplates hanger housings with any number of hanger means openings.

Referring to FIGURES 3 and 9, head 20 is shown to be a casing head of more or less conventional design and including lateral outlet manifolds 38 and 39 for access to its interior. In FIGURES 3 and 9, head 20 is shown having a Christmas-tree assembly 40 attached surmountingly thereabove.

Referring now particularly to FIGURE 9 of the drawings, head 20 is shown as having the previously referred to opening 23 vertically therethrough. Spaced below its upper end, opening 23 has a downwardly converging upwardly facing conical seat 42 is provided spaced below seat 41 and seat 42 is usually somewhat above the lower end of head 20 in order to permit access through manifolds 38, 39 therebelow. Housing 22c has a bevel 43 around its lower edge which is flushly seated upon lower seat 42. Opening 23 has vertical sides between the seats.

Housing 22c has two hanger means openings 35 vertically therethrough. Each opening 35 has a downwardly converging upwardly facing conical seat 45 therearound, the seat usually being intermediate the vertical length of the opening and usually nearer the lower end of the opening. The hanger means openings or bores 35 are positioned relatively near the outer sides of housing 22 to provide as much space as possible between the openings, and in the case of housing 22, having two openings, the openings are each centered on a diameter of the housing. The description of openings 35 applies to each of the openings 35, whatever the number of openings in the housing.

The opening 35 shown at the left-hand side of FIGURE 9 has disposed therein an adapter 47 having a conical seat 48 therearound seated upon seat 45 of the openings. Adapter 47 is outwardly cylindrical above and below its conical seat 48 and has an inward conically-tapered surface 49 adapted for engagement by the plurality of slips 50. Slips 50 each have teeth inwardly and outwardly thereof, the outer teeth being for controlled friction engagement with surface 49 and the inner teeth being adapted for controlled friction engagement with a pipe such as pipe 52 shown. The controlled friction features of the slips are described in U.S. Patent No. 2,887,754, issued May 26, 1959, to Charles F. Johnson, and entitled "Pipe Anchor."

The slips may be of any other suitable design known in the art. The slips are usually of sectional construction, a plurality of separate slips members being disposed about the periphery of the pipe to be supported. As shown, pipe 52 extended above the slips into recess 53 of member 52, which is usually a valve or other flow control device.

Referring again to FIGURE 3 of the drawings, there are shown five side-by-side circularly spaced openings 35 through the housing 22, the housing being of the form indicated in FIGURE 4. The first opening 35 at the left-hand side of FIGURE 3 contains the adapter 47 and slip 50 type of hanger apparatus already described in connection with FIGURE 9. Proceeding toward the right in FIGURE 2, the next opening 35 is shown having a mandrel hanger 54 disposed therein. Hanger 54 has a seat 55 identical with seat 48 of slip adapter 47. Seat 55 is seated upon seat 45 of the opening. Below seat 55, mandrel 54 extends below housing 22 and terminates downwardly in threaded socket formation 56 into which a well pipe may be screwed for support in the well. Socket 56 partially overlaps the head manifolds 38, 39. Above seat 55, mandrel 54 corresponds in shape with the opening 35 to the upper end of the opening and thereabove is of reduced diameter to an upwardly extending threaded socket 58 above housing 22. Socket 58 terminates upwardly at the same level as the upper face of flange 36.

The third opening 35 from the left-hand side of FIGURE 3 has a hanger 60 disposed therein which is adapted to permit inner mandrel 61 thereof to pass downwardly through outer adapter 62 thereof, and then to be drawn upwardly through the adapter to be seated, whereby a well pipe threadedly connected at socket 61a of mandrel 61 may be supported in longitudinal tension. Adapter 62 is of a form to line the sides of the opening 35 above seat 45, and has at opposite sides of its interior two inwardly projecting J-shaped support members 63 (only one being shown) each having an upper edge 65 inclined downwardly toward a vertical portion 66. Mandrel 61 is tubular and has threaded socket 67 at its upper end. Centrally of its length, mandrel 61 has two oppositely disposed outwardly projecting lugs 69 (only one being shown) each having a lower end 71 inclined to correspond with the edge 65 of one of the support members 63. The support members 63 and lugs 69 are proportioned such that the lugs can pass downwardly between the support members so that mandrel 61 may be passed from above to below mandrel 62 and vice versa. Support members 63 each have converging downwardly tapered edges 72, 73 to engage with tapered surface 74 or 75 on the mandrel lug 69 in order to guide the mandrel lugs upwardly past the adapter and for engagement by suitable tools sometimes used in positioning the adapter in the opening 35.

Still describing hanger 60, when this hanger is used it is usually desired that the pipe or casing supported thereby be placed in longitudinal tension in the well. Thus, the pipe is run into the well almost to the desired setting depth and mandrel 61 is screwed onto its upper end. Then the pipe is lowered to a position relative to the length of the pipe such that the pipe must be in longitudinal tension between its bottom end and the position of adapter 62 when mandrel 61 is seated at adapter 62. While the pipe is in this position, the lower end of the pipe is cemented in place by cement forced downwardly through the pipe and at least part way into the well around the lower end of the pipe and allowed to set. The pipe is purged of cement by introduction of a fluid. After the cement has set and the lower end of the pipe is fixed in place, mandrel 61 is drawn upwardly so that the lugs 69 pass the support members and then upper end of the pipe is rotated approximately 90° to bring the lugs to above the support members so that they can be seated thereon. Because of the inclined edges 65 and 71, lugs 69 tend to engage vertical portions 66 of the support members thereby fully supporting the lugs and mandrel 61.

In the opening 35 which is the fourth from the left in FIGURE 3, the suspension means is another type which can be lowered below its point of suspension and later raised to be seated. It also fits into any of the openings 44 and is supported by conical shoulder 45 thereof. Tubular mandrel 80 is connected to a tubing string (not shown) which it supports at threaded socket connection 81. Mandrel 81 is lowered into the hole by means of a length of pipe connected at its upper end at threaded socket connection 82. If it is desired to lower the hanger and pipe string below the point at which it is to be finally suspended, ring 83 which is attached to the mandrel 80 by means of coarse threads 84 is removed before the mandrel is lowered into the well. With ring 83 thus removed, mandrel 80 will be of smaller diameter than opening 85 and will therefore be able to pass below shoulder 45. After those operations for which it is desirable that the hanger and pipe string be lowered below their point of final suspension are completed, mandrel 80 is then raised to a point slightly above its final resting position. Ring 31 is then passed over the upper end of the supporting pipe and lowered to a point where it engages the threads 84 on mandrel 80 by remote means, for example, extension rods. Ring 83 is rotated in a clockwise direction so as to engage the threads 84 and connect it to mandrel 80. Thus connected, ring 83 then becomes an integral part of mandrel 80 and provides supporting means to rest on shoulder 45. Mandrel 80 is then lowered until ring 83 comes to rest on shoulder 45 thereby supporting the tubing string therebelow. Tension suspension can be accomplished with this hanger.

Still referring to FIGURE 3 of the drawings, in the opening 35 shown at the extreme right-hand side of the figure, there is disposed a hanger 90 which includes a body 91 having an outward form corresponding to the form of the opening 35. Body 91 has a vertical passage 92 therethrough having lower threaded socket formation 93 and upper threaded socket formation 94. The casing or other pipe string to be supported is secured to body 91 at threads 93 and a handling joint of pipe or a flow connection nipple may be screwed into upper threads 94. It will be noted that the principal differences between this hanger and that disposed in the opening 35, second from the left in FIGURE 3, are that there is no part of the hanger extending below housing 22 and that there is no part of the hanger extending above housing 22. Later on when the multi-layer seal above the housing 23 is described in detail, the distinction in the sealing brought about by this change in form of the hanger will be made clear. Hanger 90, like the second hanger from the left in FIGURE 3, is not of the pipe-tension type. The first, third and fourth hangers from the left side of FIGURE 3 are suitable for tension.

Member 40 has already been described as being surmountingly connected above head 20. Member 40 has lower connection flange 95. Flange 95 of member 40 and flange 36 of head 20 are bolted together in the conventional manner by a plurality of bolts 96 and a seal between the flanges is provided by a steel ring gasket 97 disposed in corresponding grooves in the faces of the flanges or in any other suitable manner.

Member 40, as has been described, will usually be a flow control device, for example, a valve. Member 40 in the form shown in FIGURE 3 has parallel vertical cylindrical openings or bores 100a–100e which open at its lower end. Bores 100, 101 each include at its lower end a counterbore 102 and therebelow a counterbore 103 of enlarged diameter providing space for seals either with the upper end of the well pipe or with a flow nipple connecting between the hanger and member 40. A still larger counterbore 104 surrounds the lower ends of all of the counterbores 103.

In the multiple seal of FIGURE 3, each separate seal includes an upper retainer ring 105, an intermediate ring or layer 106 of compressible packing material, and a lower compression ring 107. Seal material 106 is between rings 105 and 107. Since ring 105 abuts the upper end of counterbore 103 and is held against upward movement thereby when ring 107 is moved upwardly, the packing material will be axially compressed to form a seal between the pipe or nipple and member 40. The compression rings 107 of the several seals are commonly urged upwardly by a common compression plate 109 in counterbore 104 which has lower outer bevel 110 engaged by a plurality of lock screw means 111 disposed radially through flange 95.

Referring now to FIGURE 9, there is shown an alternative seal to that shown in FIGURE 3. In this form of seal, seal nipple 112 and pipe 52 each extends into a separate counterbore 113 of member 40 which is of largest diameter at space of portions 114 and 115, and which is relatively large compared with the pipe 52 or 112 diameter between the largest portions 114, 115 and only slightly larger than the pipe diameter at its end portions. Resilient seal rings 116 and 117 are fitted into counterbore portions 114, 115, respectively. Plastic sealing material 118 is forced into counterbore 113 between rings 116, 117 through passages 119 and check valves 120 through injection devices 121 to fill the counterbore between rings 116, 117 with plastic sealing material and closable outlet passages 122 which extend to an outer point of flange 95 insure complete filling. At the point where passage 122 intersects the outer surface of flange 95 there is provided a threaded plug (not shown) which is removed when plastic sealing material is first introduced into the seal. Passage 122 is allowed to remain open until sufficient plastic sealing material has been injected through passages 119 to fill the counterbores. Once it has been noted that the plastic sealing material is being discharged through the outlet of passage 122, the threaded plug is reconnected to the outlet of passage 122. Thereafter additional plastic sealing material is forced through passage 119 to apply pressure to the sealant between seal rings 116 and 117. As a rule, pressure slightly in excess of the rated work pressure of the seal is applied to the plastic sealing material thereby effecting a seal capable of containing any pressure below the pressure applied to the plastic sealing material.

Referring now to FIGURE 14 of the drawings, there is shown a well 130 extending downwardly from the earth's surface 131, with the surface or conductor casing 21 disposed therein at least down to a depth where the earth formations around the well are more or less stable. Casing 21 is threaded at 132 above the earth's surface and head 20 is screwed thereon at lower threaded socket formation 133 thereof. FIGURE 14 shows the apparatus as employed during drilling of a well, and a blowout control device such as blowout preventer 135 is attached to flange 36 of the head. Also shown in FIGURE 14 is a casing hanger 136 supporting a well-lining casing 137, which may be used in case a completion of the "tubingless" type cannot be made because of circumstances encountered during drilling or because of change requested by the well owner. However, a second intermediate casing 137 will often be run, and then the completion finalized in the tubingless manner therethrough. In this case, the blowout preventer 135 will be disconnected from head 20 and a second well head 20 installed to perform the same functions as head 20 but through casing 137 instead of casing 21. Inasmuch as such a second head would differ from head 20 only in the manner of its lower connection above the well and in size, it is not believed necessary to burden the disclosure with a repetitive showing of same.

In case completion of well 120 has been commenced employing a different type of bottom head, then conversion may be made to use of the apparatus described herein by providing head 20 with a lower flange connection thereabove, after which the procedures and apparatus herein described may be employed. This may be necessary in case the head originally set above the well is not adaptable to slip support of an intermediate casing and it may become advisable to alter the well by flange connecting a flange-equipped head 20 above the original head in order that the advantages of the slip-type casing support may be realized. Hanger 136 is of the type shown in U.S. Patent No. 2,824,757 issued Feb. 25, 1958, to Allen F. Rhodes and entitled "Pipe Suspension and Sealing Means With Means To Limit Compression of the Seal." Casing 137 is terminated or cut off at a suitable point above the hanger so that interference with the equipment thereabove will not occur.

Referring now to FIGURE 11 of the drawings, completion and Christmas-tree apparatus for a well completed according to the principles of this invention are shown, the equipment being for a triple parallel casing tubingless completion well. Head 20 is shown attached as heretofore described to the upper end of casing 21. A lateral flow nipple 140 is screwed into each manifold 38, 39 of head 20 and these may each be controlled by a valve 141 secured thereto. In FIGURE 11, member 40 is in the form of an adapter 40a which has tapped bolt holes in its upper surface. Flange 95 is secured to head 20 as heretofore described. Three separate valves 144, 145 and 146 are disposed surmountingly on adapter 40a and bolted thereto at the lower flange 147 of each. The valves 144–146 are rotatively positioned to avoid interference therebetween, a helical arrangement of the hand wheels thereof satisfying that condition. A triple bore flow manifold 150 tapped for bolted connection at its lower surface is bolted to each of the upper flanges 151 of the valves. Adapter 40a, valves 144–146 and manifold 150 are handily supplied as a unit, and may be replaced by a triple valve device including the lower seals of adapter 40a, the manifold function of manifold 150, and the valve functions in a single body. In other words, members 40a, 144–146 and 150 may be made integral or separate as desired.

Manifold 150 has three vertical bores or openings (not shown) therethrough each aligned above the flow conduit of one of the valves 144–146, which in turn are each aligned above a well pipe or a well pipe and flow nipple 112. Thus, the bores of manifold 150 form the upper ends of straight passages into the well which have no bends or reductions in size since valve 144–146 will be of selected size as regards the equipment therebelow. The wing flanges 152 of manifolds 150 will usually be 120° apart around manifold 150, although in FIGURE 11 a different arrangement is shown. A wing valve 156, choke 157, or other flow control devices, are usually provided for each wing of the manifold. A tapped bull plug 158 is threadedly connected into the upper end of each manifold bore so that the pressure gauges 159 may be installed for determination of bore pressures.

Still referring to FIGURE 11, there are shown three well pipes 52a, 52b and 52c. The hangers for only pipes 52a and 52b are shown in FIGURE 11. Pipes 52a and 52b are both shown supported in housing 23 by slip-type hangers as are shown in the left-hand opening of both of FIGURES 3 and 9. The seals shown in FIGURE 11 sealing between the upper ends of pipes 52a and 52b and adapter 52a are of the type shown in FIGURE 9.

Referring to FIGURE 12, there is shown another triple parallel casing tubingless completion. Head 20 is installed above casing 21 as before the casings 52a, 52b, and 52c are supported as in FIGURE 11. The apparatus shown in FIGURE 12 is not entirely of the tubingless type as that term is presently employed in the art, because in each outer casing there is installed an inner concentric tubing. However, the equipment of FIGURE 12 is of the tubingless type insofar as the casings themselves are concerned. Surmounting head 20, there is provided a manifold adapter 40b which is so termed because it provides manifolds for production delivered through the casing and serves as an adapter for connection of valves to control flow through the tubing.

Manifold adapter 40b has three identical vertical bores, only one bore 166 being shown. Each bore has a lateral flow outlet manifold 167 terminated outwardly in a bolted connection to a wing valve 168. At its upper surface 170, the manifold adapter bores are each provided with a tapped counterbore 171 (see also FIGURE 13) into which there is screwed the threaded lower end of a tubing hanger body 172. Each body 172 is of generally cylindrical tubular form. Interiorly each body 172 has a seat 173 of downwardly converging conical form upon which is seated the cooperating downwardly facing conical seat 174 of a hanger mandrel 176. The mandrels 176 each have a lower threaded socket formation 177 to supportingly engage the upper end of a well tubing 179a, b, or c. The tubular form of each of the hanger mandrels 176 is outwardly thick toward the upper end, and a pair of O-rings or other suitable seals 180 and 181 are disposed in suitable grooves therearound to provide a fluid-tight seal between the hanger mandrel and the hanger body in which it is disposed. In a circular groove 183, positioned immediately above the hanger mandrel, there is received a snap ring 184 which serves to hold the hanger mandrel in its seated position.

The hanger bodies 172 are each outwardly threaded at 185 around their upper ends to engage an inwardly threaded collar 187 having an inwardly projecting upper flange 188 which overhangs an upwardly facing conical seat 189 of a tubular conduit 191, the latter usually being the lower flow outlet of a valve. Conduit 191 is flared interiorly toward its lower end at 192, and therebelow there is provided a downwardly diverging conical surface 193. A mirror image upwardly facing conical seat 194 is provided at the upper end of each hanger body 172 and a ring gasket 196 is clamped between seats 193 and 194 to form a seal. This seal may be compressively energized by and tightened by tightening collar or ring 187. Thus, in the apparatus of FIGURE 12, there are the three well casings 52a, 52b and 52c each having one of the well tubings 179a, 179b or 179c coaxially disposed therethrough. Usually the casing 52a, 52b or 52c will extend into the well to three upper producing formations and the tubings 179a, b and c will extend into the well to three lower producing formations. However, the degree of the extent of each of the casing and tubing is subject to wide variation.

In FIGURE 12, three valves 200, 201 and 202 are each connected by a conduit 191, forming the lower portion thereof, to one of the bores of manifold adapter 40b in the described manner. The conduits 191 are of different lengths for each of these valves in order that the valve may be arranged helically for the convenience of the well operator and for noninterference therebetween. At the upper connection of each of the valves 200–202 there is screwed a pipe nipple 205 at the upper end of which is provided a pipe T 206 onto the side outlet of which are connected a wing valve 207 and a flow control choke or other means 210, and into the upper end of each of which is screwed a tapped bull plug 211 carrying a pressure-gauging assembly 212.

The advantages of this apparatus lie chiefly in the interchangeability between the various component parts, which in turn permits the user to maintain complete control of the well at all times. In the drilling of a well, some of the strata encountered will be found to contain gas, oil, salt water, or combinations thereof, under extremely high pressures. These pressures must be controlled if drilling is to be commercially successful. Commonly, two methods for controlling such pressures are employed. One method is to keep the open well bore filled at all times with a high density fluid which will exert a hydrostatic pressure at least slightly in excess of each of the various formation pressures. This method is not always satisfactory since abnormally high formation pressures are sometimes unexpectedly encountered at relatively shallow depths, in which case there is insufficient depth for the high density fluid column to have a hydrostatic pressure greater than all of the formation pressures. Other conditions, such as porous formations which allow the fluid in the well bore to drain into the formation voids, the entrapment of gas into the well fluid, and so forth, all prevent this method of pressure control from being effective in every case. A secondary means of pressure control must therefore be employed. This secondary means may be one of the devices known as blowout preventers, one such being shown in FIGURE 14, indicated by reference numeral 135. Such a device functions as a control valve at the surface of the well and is used to contain pressure in excess of that controlled by the well fluid. To be effective, these blowout preventers must be attached to the surface casing of the well by fluid and gas-tight connections and these connections must be maintained at all times during which it is possible for the formation pressure to overcome the hydrostatic head of the well fluid. Ordinarily, there is only one circumstance in which it is safe to remove the blowout preventers from the well. This occurs immediately following the setting and cementing of a string of casing. After casing has been set, cement is pumped through its inner passage and out its lower end and up the annular space between the bore of the well and the outer diameter of the casing. The amount of cement used is calculated in order to have a column of cement between casing and hole of sufficient height to extend to above the shallowest producing formation. The cement is circulated into the proper position by displacement from inside the casing with well fluid or water. However, a column of cement usually 30 to 60 feet in height is ordinarily allowed to remain inside the casing bore. This column usually provides a pressure-tight seal between the inside of the casing and the annular space outside the casing above the cement which is at formation pressure. The casing is also supported in tension by a casing hanger which not only supports the casing but also seals the annular space between the outer diameter of the casing and the inner diameter of the well head which is connected to the conductor or surface casing. After the cement has been given sufficient time to harden, it is then safe to remove the blowout-preventer assembly in order to attach another well head body or tubing head for the purpose of supporting still another string of pipe. With the casing sealed around its outer diameter by the casing hanger and sealed aat its lower end by the cement, there is little danger of formation pressures being released to the surface. It is necessary, however, that the blowout-preventer assembly be reattached to the well head assembly with a pressure-sealing connection prior to resumption of any drilling operations or completion operations which may again expose the surface outlet of the well to uncontrolled formation pressures. Except during the above described conditions, blowout preventers must at all other times be tightly attached to the upper outlet of the well bore. The use of this apparatus specifically provides for the maintenance of blowout preventer control at all times regardless of what well conditions are encountered.

With head 20 connected to the upper end of the surface casing 21 and with blowout preventer 135 connected to the upper end of head 20, drilling or completion operations necessary to properly deal with any well conditions encountered may be carried out. For example, if the well is successfully drilled to its desired depth without encountering any unusual conditions, head 20 can be used for supporting and sealing off any desired number of parallel well completion casings. In this case, the desired number of parallel producing casing strings, depending upon the number of formations to be produced, may each be suspended by any one or a combination of the five separate suspension means provided by this apparatus. The types of suspension selected will depend upon well conditions and the preference of the user. If the walls of the well have been found to be reasonably firm and stable during drilling or if there is to be suspended a relatively small number of casing strings, it may be desirable to use the simpler landing collar or threading mandrel-type of suspension. Ordinarily, the possibility exists that one or more of the casing strings may become stuck before it has been lowered to the desired depth. The slip-type suspension may be preferred or necessary in this case. Furthermore, if the user desires to utilize some specialized piece of equipment at the lower end of a casing string with which it is necessary that the pipe be lowered to a point below its final setting depth and then raised back to the proper elevation, he may then select either the lug-type or removable-ring type of suspension. Still other conditions and circumstances may effect the selection of the suspension means for each string of casing. However, the five types provided by this apparatus will meet satisfactorily all favorable or adverse conditions and circumstances encountered.

After the desired number of casing strings have been suspended, they are then cemented in place at their lower ends with the blowout-preventer assembly still attached to head 20. After the cement has hardened, a pack off or seal assembly is lowered into the well head through the blowout preventers and installed around the upper ends of the casing strings (or extensions thereof). This seal is then made tight by lockscrews which compress the seal. It is then safe to remove the blowout-preventer assembly and finish completion of the well. Production is separate through each individual casing. A Christmas tree or control manifold as shown in FIGURE 11 is installed by being connected to head 20. After this, the various strings of casing are perforated opposite the formations that are to be produced through them. The perforating guns are lowered into the casing by installing a wire line lubricator in place of the tapped bull plugs 158 shown in FIGURE 11. The perforating gun is lowered into position on a steel cable which also carries an electrical conductor for orienting and actuating the perforating gun. After the casing has been perforated, the perforating gun is retrieved by raising it back to the surface and into the lubricator by means of the steel cable. Before the perforating gun and lubricator are removed from the Christmas tree, valve 144, 145 or 146 is closed to control any pressure which may escape from the now-producing formation. Any pressure above valve 144, 145, or 146 is released and it is then possible to remove the perforating gun and lubricator for replacing the threaded bull plug 158. This operation of perforating the casing is repeated in each string of casing.

If the well is to be produced through both casing and tubing, completion apparatus as shown in FIGURE 12 is installed. In this case, manifold adapter 40b and the Christmas-tree equipment associated therewith are connected to head 20 instead of the adapter 40a and the Christmas-tree equipment associated therewith shown in FIGURE 11. Each tubing hanger body 172 is connected in an upper outlet of adapter 40b. At this point, the completion may be made in one of several ways. One method is described as follows. A small blowout preventer or gate valve is connected to the upper end of tubing hanger body 172 supporting the first string of casing. A perforating gun capable of being oriented so as not to damage adjacent strings of pipe is then lowered into the first string of casing through the blowout preventer by means of a wire line, and both formations which are to be produced through the casing and tubing are perforated with the gun. The perforating gun is removed and the tubing string is lowered into the casing. A seal means is attached near the lower end of the tubing string to be received by receptacle installed in the casing strings at a point between the upper and lower producing formations. At a point just before the seal means on the tubing engages the receptacle in the casing, water or other fluid is pumped into the tubing and up through the tubing-casing annulus and out through the side outlet 167 and valve 168 in order to displace the high density fluid inside the casing. Tubing joints of the correct length are then made up in the tubing string so that the seal means near the lower end of the tubing will be received into the receptacle and casing when the tubing string is suspended to its proper depth. The hanger mandrel 176 is connected to the upper end of the tubing string and then lowered into position supported by shoulder 173 of hanger body 172. After the tubing has been suspended, a seal plug is inserted into the inner passage of the tubing. The blowout preventer is then removed and the Christmas tree or control manifold installed by being connected to hanger body 172 by coupling 187. A lubricator device is then installed at the upper end of the Christmas tree in place of threaded bull plug 211. A suitable tool is passed through this lubricator device to engage the seal plug inside the tubing passage which is released and retrieved. Valve 200 is then closed, the pressure above it let off, the lubricator device and seal plug removed and bull plug 211 reconnected to the Christmas tree. Formations to be produced through the other casing and tubing strings are completed in the same manner, after which production through the tubings are controlled by valves 200, 201 and 202 and through the casings are controlled by valves 168.

The apparatus set out in this disclosure also permits the user to maintain blowout control even when unexpected conditions arise. For example, should it happen in the drilling of the well that a formation is pierced which requires the setting of an intermediate string of casing, it is possible to do so with this apparatus. Intermediate string of casing 137 can be run into the well and suspended by a casing hanger 136 as shown in FIGURE 14. The casing hanger fits into and is supported by head 20 and seals off between the casing 137 and head 20. After such an intermediate string of casing has been set, it can then be cemented after which it is then safe to remove the blowout preventers and install a second casing head 20 to receive the production casing suspension means for plural casings or casings and tubings.

Referring again to FIGURE 3 of the drawings, there is provided a novel seal apparatus or pack off above the hanger body 22 within opening 23 of head 20 which is adaptable to form a fluid-tight seal around any of the described hangers within the opening. The seal or pack off is designated generally by reference numeral 220. A lower support or bridge plate 221 has the required number of stepped openings 222 therethrough depending on the number of pipe strings to be set, openings 222 being disposed properly to receive the hangers and/or well pipes centrally therethrough. Openings 222 are sized to closely but freely receive the upper ends of hanger types 54, 80, which are of largest diameter, and to receive with larger clearance the well pipe 52, the upper end of mandrel 61, and the pipe nipple 224 screwed into threads 94 of hanger 91. Fit of the openings 222 around the latter is provided by outwardly stepped support rings 225, 226, 227 which fit the stepped openings 222 and closely but freely receive the hanger, mandrel or nipple. Plate 221 rests upon hanger body or bowl member 22, flushly upon its upper surface, and provides an uninterrupted seal support.

Spaced above plate 221 is a similar compression plate 231 having stepped openings 232 which are inverted as regards openings 222 and for the same purpose, additional support rings 225, 226, 227 are provided as before where required by the type of hanger employed.

Thinner rings 35 fill the step recesses around the larger diameter hanger assemblies. Plate 231 has upper outer bevel surface 236 for engagement by a plurality of spaced lockscrews 237 each radially through the flange 36 of head 20 to urge down plate 231 to compress and actuate the seal.

Plate 221 has conical seat 238 on corresponding conical seat 239 within the opening 23.

Between plates 221, 231 there is disposed a layer or web of seal material 240 usually of elastomeric material which is perforated suitably to receive the pipes, hangers, mandrels, and nipples passing therethrough. Seal 240 closely fits the members passing through it and the sides of opening 23, so that when lockscrews 237 are screwed in to actuate the seal fluid-tight seals are formed at all interior and exterior sides of the seal. Seals 240 are formed to fit for each combination of hanger types which might be employed.

Referring now to FIGURE 9 of the drawings, there is shown a seal 240a of modified design which may be used instead of seal 240. Seal 240a has a layer or web 240b of seal material having perforations 240c of identical size, the size of perforations 240c usually being the same as openings 222, 232. Perforations 240c are of a size to closely receive the larger hangers such as mandrel 54 shown at the right-hand side of FIGURE 9, and are larger than the pipe 52 above the hanger shown at the left-hand side of FIGURE 9. Adapter rings 240d usually of the same material as layer 240b are provided to fill the excess space of perforations or openings 240c where the opening is larger than the hanger or pipe element extending therethrough. Rings 240d fit closely within openings 240c and closely around the element they surround so that dependable fluid-tight seals will be formed at their loctaions. The use of seals 240a instead of seals 240 eliminates need to provide a seal 240 with certain sizes of perforations or openings for any particular completion hanger combination.

A packoff comprising a lower support plate 221, an upper compression plate 231, and an intermediate layer of elastomeric seal material 240 or 240a is commonly known in the art as a "sandwich packoff."

FIGURE 15 shows a plug 245 which is disposed in a hanger opening 35 of housing or hanger bowl 22 to close the hanger opening. One or more plugs 245, or plug bodies, will be used when for some reason a lesser number of hangers are employed than the housing 22 is adapted to support. It will be noted that the upper ends of the plugs are flush with the upper surface of housing 22 so that full support for the seal or pack off element thereabove is provided. Each plug 245 has a conical seating surface 246 therearound to flushly seat upon the seat 45 of the opening 35. The lower ends or faces of the plugs terminate flushly with the lower surface of housing 22. The multiple valve assembly of the Christmas tree above head 20 can be adapted to exclude the valve and flow manifold corresponding to the opening 35 blanked off.

While preferred embodiments of the invention have been shown and described, many modifications thereof may be made by a person skilled in the art without departing from the spirit of the invention, and it is intended to protect by Letters Patent all forms of the invention falling within the scope of the following claims:

What is claimed is:

1. Plural parallel well pipe suspension apparatus, comprising a well head having a vertical opening therethrough supported above a well and having hanger bowl support means at said vertical opening, hanger bowl means supported in said vertical opening of said well head and supported by said hanger bowl support means, said hanger bowl means including a plurality of pipe receiving openings therethrough, hanger seat means at each said pipe receiving opening, separate hanger means in each said pipe receiving opening having seating surfaces thereon supported upon the hanger seat means for support of a well pipe in the well, each said hanger means including means for connection thereof with a well pipe for support of the well pipe in the well, multiple hanger means of each of multiple types of hanger means, said separate hanger means in each said pipe receiving opening each being one of said multiple hanger means, said multiple hanger means of each of multiple types of hanger means comprising first-type hangers each including a ring shaped body having an exterior seat adapted to seat upon the hanger seat means of any of said pipe receiving openings and having an upwardly diverging conical opening therethrough, and slip means disposed in said conical opening against the sides thereof adapted to grip and support a well pipe disposed therethrough; and second-type hangers each including a tubular mandrel body having an exterior seat adapted to seat upon the hanger seat means of any of said pipe receiving openings and extending to above and to below said hanger bowl means and having pipe connection means at its lower end for connection to and support of a well pipe; and third-type hangers each including a ring shaped body having an exterior seat adapted to seat upon the hanger seat means of any of said pipe receiving openings and having interior projecting means, and including a tubular mandrel received through said body and having exterior projecting means adapted to either seat upon or to pass said interior projecting means of said body depending on the position of rotation of said mandrel relative to said body, and having pipe connection means at its lower end for connection to and support of a well pipe; and fourth-type hangers each including a ring shaped body having an exterior seat adapted to seat upon the hanger seat means of any of said pipe receiving openings and having threads at the interior thereof, and an inner tubular mandrel having threads exteriorly therearound adapted for screwed engagement with said body threads and having pipe connection means at its lower end for connection to and support of a well pipe; and fifth-type hangers each including a ring shaped body having an exterior seat adapted to seat upon the hanger seat means of any of said pipe receiving openings, said body terminating flushly upwardly and downwardly with the upper and lower surfaces of said hanger bowl means, and said body including pipe connection means at its lower end for connection to and support of a well pipe.

2. Plural parallel well pipe suspension apparatus, comprising a well head having a vertical opening therethrough supported above a well and having hanger bowl support means at said vertical opening, hanger bowl means supported in said vertical opening of said well head and supported by said hanger bowl support means, said hanger bowl means including a plurality of pipe receiving openings therethrough, hanger seat means at each said pipe receiving opening, separate hanger means in each said pipe receiving opening having seating surfaces thereon supported upon the hanger seat means for support of a well pipe in the well, each said hanger means including means for connection thereof with a well pipe for support of the well pipe in the well, multiple hanger means of each of multiple types of hanger means, said separate hanger means in each said pipe receiving opening each being one of said multiple hanger means, pack off means in said vertical opening surmounting said hanger bowl means, means to actuate said pack off means to seal about each said separate hanger means and around the sides of said vertical opening, adapter means secured surmountingly of said well head, said adapter means having formed therein a vertical flow passage sealingly communicating with each well pipe to receive flow therefrom and also to receive a tubing string therethrough with clearance therearound, lateral flow outlet means in said adapter means from each said flow passage, means at the upper end of each said flow passage for supporting the tubing string, and flow control means for each tubing string above the means for supporting same.

3. Apparatus comprising
a well head,
hanger bowl means supported in said well head,
a plurality of hanger means supported in said hanger bowl means,
a tubular element supported in each hanger means,
one tubular element being of a diameter different from the others,
a sandwich packoff in said well head having a plurality of openings therethrough, all of substantially the same diameter,
and an adapter around at least one tubular element and in one of said openings to adapt said packoff to seal therearound.

4. A sandwich packoff comprising
a support plate,
a compression plate above said support plate, and
an elastomeric seal member between said plates,
a plurality of aligned vertically extending openings through said plates and said seal member,
and a seal including an annular adapter ring, in at least one aligned opening, positioned to sealingly engage a tubular member received therein.

5. A sandwich packoff as defined by claim 4 wherein said seal comprises
a first rigid annular ring in the opening in the support plate having a configuration such that it is supported by said support plate,
a second rigid annular ring in the opening in the compression plate having a configuration such that it is engaged by and moved downwardly with said compression plate upon compression of said seal member,
a third annular ring of elastomeric material in the opening in the seal member.

6. Apparatus comprising
a well head,
a plurality of hanger means supported in said well head,
a well pipe supported by each hanger means,
a tubular element extending upwardly at each hanger means,
one tubular element being of a diameter different from the others,
a sandwich packoff in said well head having a plurality of openings therethrough all of substantially the same diameter, through which said tubular elements extend,
and an adapter around at least one tubular element and in one of said openings to adapt said packoff to seal therearound.

7. Plural parallel pipe suspension apparatus, comprising
a wellhead adapted to be supported above a well,
a plurality of substantially identical pipe receiving openings extending vertically therethrough,
substantially identical hanger seat means at each said pipe receiving opening,
separate hanger means in each said pipe receiving opening, each hanger means having a seating surface for support thereof upon the hanger seat means,
one of said hanger means comprising the type suitable for supporting a well pipe in tension, wherein the pipe is elevated relative to the hanger after the lower end of the pipe is rigidly fixed,
and another of said hanger means is of a different type from the said tension supporting type.

8. Plural parallel type suspension apparatus, comprising
a wellhead adapted to be supported above a well,
a plurality of substantially identical pipe receiving openings extending vertically therethrough,
substantially identical hanger seat means at each said pipe receiving opening,
separate hanger means in each said pipe receiving opening, each hanger means having a seating surface for support thereof upon the hanger seat means,
one of said hanger means comprising a one piece mandrel hanger having female threads for connection to a well pipe,
and another of said hanger means comprising an adapter sleeve member for seating on the hanger seat means, and means within said adapter sleeve member, having pipe engaging means thereon, having structure thereon adapted to engage said adapter sleeve member to support the well pipe against relative downward movement, and to allow the well pipe to be moved upwardly relative to the hanger bowl to apply tension on the well pipe after the lower end of the pipe is rigidly fixed.

References Cited

UNITED STATES PATENTS

| | | | |
|---|---|---|---|
| 1,623,010 | 3/1927 | Hosmer | 166—88 |
| 1,768,908 | 7/1930 | Hopkins | 166—88 |
| 2,153,852 | 4/1939 | Tschappat | 166—88 |
| 2,335,355 | 11/1943 | Penick et al. | 166—89 |
| 2,589,483 | 3/1952 | Eckel et al. | 166—89 |
| 2,768,007 | 10/1956 | Brenner | 166—89 |
| 2,771,956 | 11/1956 | Johnson | 166—88 |
| 2,830,665 | 4/1958 | Burns et al. | 166—75 |
| 3,001,803 | 9/1961 | Watts et al. | 166—88 |
| 3,011,804 | 12/1961 | Burns et al. | 166—75 |
| 3,020,069 | 2/1962 | Word | 166—89 |
| 3,028,917 | 4/1962 | Rhodes | 166—97 |
| 3,059,698 | 10/1962 | Burne et al. | 166—97 |

OTHER REFERENCES

World Oil, Composite Catalog 1955–56, p. 3600.

JAMES A. LEPPINK, *Primary Examiner.*